(12) United States Patent
Chen et al.

(10) Patent No.: US 11,073,236 B2
(45) Date of Patent: Jul. 27, 2021

(54) DISPLAY APPARATUS AND HEIGHT ADJUSTMENT MECHANISM THEREOF

(71) Applicant: QISDA CORPORATION, Taoyuan (TW)

(72) Inventors: Chih-Sheng Chen, Taoyuan (TW); Yen-Chen Chiang, Taoyuan (TW); Hsin-Hung Lin, Taoyuan (TW); Kuan-Hsu Lin, New Taipei (TW)

(73) Assignee: Qisda Corporation, Taoyuan (TW)

( * ) Notice: Subject to any disclaimer, the term of this patent is extended or adjusted under 35 U.S.C. 154(b) by 68 days.

(21) Appl. No.: 16/697,213

(22) Filed: Nov. 27, 2019

(65) Prior Publication Data

US 2020/0200321 A1  Jun. 25, 2020

(30) Foreign Application Priority Data

Dec. 21, 2018 (CN) .......................... 201811572850.3

(51) Int. Cl.
*F16M 11/04* (2006.01)
*G06F 1/16* (2006.01)
*H04N 5/655* (2006.01)

(52) U.S. Cl.
CPC ......... *F16M 11/046* (2013.01); *G06F 1/1601* (2013.01); *H04N 5/655* (2013.01); *G06F 2200/1612* (2013.01)

(58) Field of Classification Search
CPC ............... F16M 11/0406; G06F 1/1601; G06F 2200/1612; H04N 5/655
See application file for complete search history.

(56) References Cited

U.S. PATENT DOCUMENTS

| 7,150,440 B2 * | 12/2006 | Yuan | F16M 11/10 248/372.1 |
|---|---|---|---|
| 2003/0189155 A1 * | 10/2003 | Serbinski | F16M 11/10 248/371 |
| 2008/0117574 A1 * | 5/2008 | Lee | G06F 1/1601 361/679.06 |

FOREIGN PATENT DOCUMENTS

| CN | 1959852 A | 5/2007 |
|---|---|---|
| CN | 107634367 A | 1/2018 |

\* cited by examiner

*Primary Examiner* — Anita M King

(57) ABSTRACT

A display apparatus includes a display monitor and a height adjustment mechanism. The display monitor has a frame with a height adjustment slot. The height adjustment mechanism includes a base fixed in the frame, a sheet structure disposed in the frame in a laterally slidable manner, a sliding plate, and a support stand passing through the height adjustment slot to be connected to the sliding plate such that the frame could be movable relative to the support stand. The sliding plate is slidably disposed in the base and has an abutting structure abutting under the sheet structure. When the frame is located at a high position, the abutting structure and the sheet structure cover the height adjustment slot. When the frame moves to a low position, the support stand relatively moves upward along the height adjustment slot to make the abutting structure push the sheet structure to slide laterally.

14 Claims, 6 Drawing Sheets

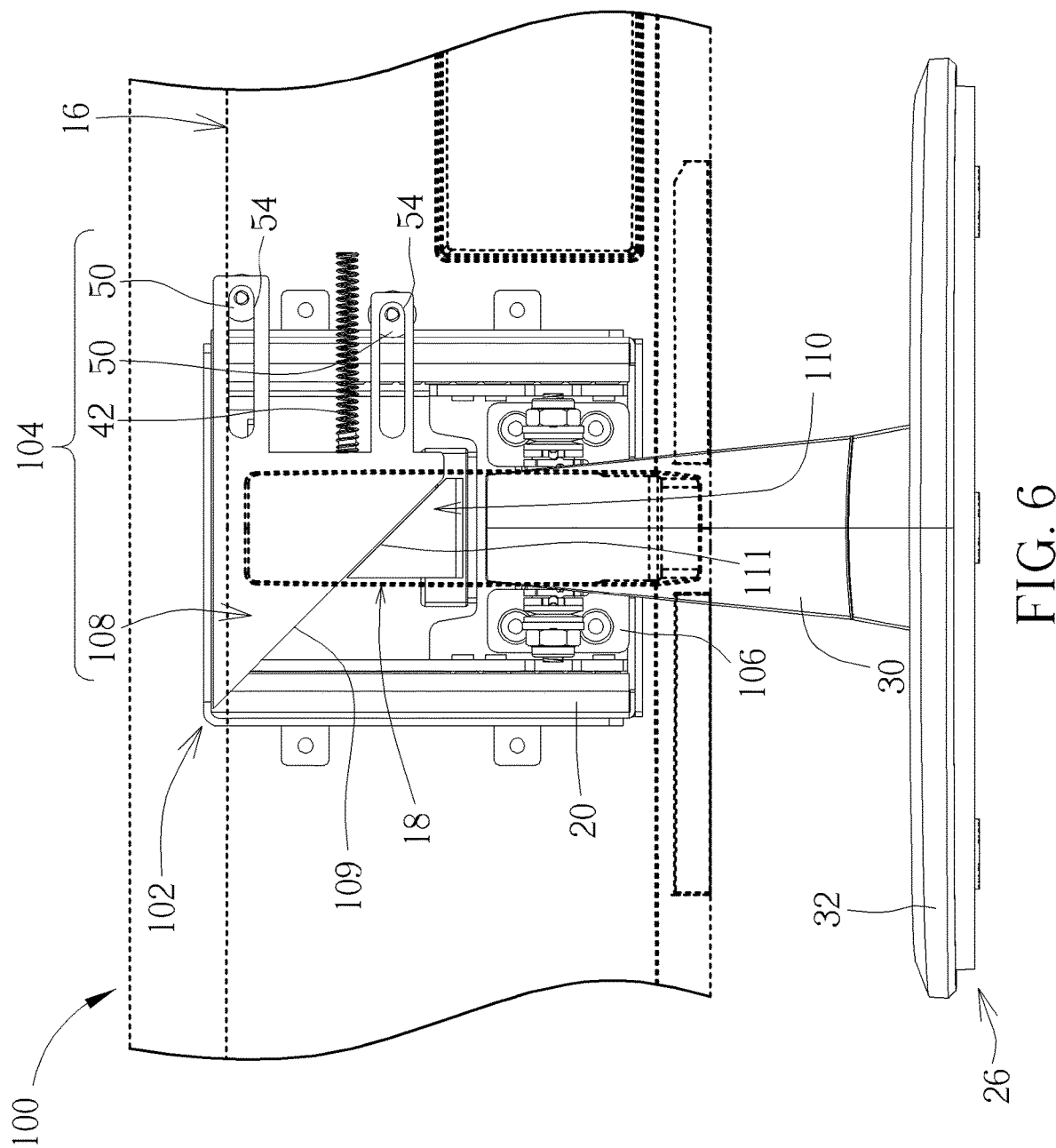

DISPLAY APPARATUS AND HEIGHT ADJUSTMENT MECHANISM THEREOF

BACKGROUND OF THE INVENTION

1. Field of the Invention

The present invention relates to a display apparatus and a height adjustment mechanism thereof, and more specifically, to a display apparatus utilizing a sheet structure to cover a height adjustment slot of a frame and a height adjustment mechanism thereof.

2. Description of the Prior Art

With development of display technology, a flat panel monitor has become the most common display device, such as a liquid crystal display monitor. Due to its radiation-free property, thin shape, and low power consumption, the liquid crystal display monitor is widely applied to electronic products, such as a desktop computer or a notebook.

In general, the display monitor is disposed on a support stand having a height adjustment mechanism mounted thereon for a user to adjust a height of the display monitor relative to the support stand conveniently. The conventional height adjustment mechanical design involves penetrating a support arm of the support stand through a height adjustment slot on a back side of the display monitor to be connected to a sliding plate mechanism in the display monitor. As such, via the mechanical design that a plate member is slidable in the sliding plate mechanism, the support arm connected to the plate member could be slidable along the height adjustment slot for the user to perform a height adjustment operation according to the practical needs.

However, in this design, since the support arm cannot completely cover the height adjustment slot when the user raises the display monitor, it may cause the user to see the mechanisms inside the display monitor through the height adjustment slot, so as to influence the external appearance and the use feeling of the display monitor.

SUMMARY OF THE INVENTION

The present invention provides a display apparatus including a display monitor and a height adjustment mechanism. The display monitor has a frame. A height adjustment slot is formed on a back side of the frame. The height adjustment mechanism is connected to the back side of the frame. The height adjustment mechanism includes a base, a sheet structure, a sliding plate, and a support stand. The base is fixed in the frame corresponding to the height adjustment slot. The sheet structure is disposed in the frame in a laterally slidable manner to be slidable between a covering position and an opening position relative to the height adjustment slot. The sliding plate is slidably disposed in the base. The sliding plate has an abutting structure abutting under the sheet structure. The support stand has a support arm and a bottom plate. The support arm extends upward from the bottom plate to pass through the height adjustment slot to be connected to the sliding plate for making the frame movable between a high position and a low position relative to the support stand. When the frame is located at the high position, the abutting structure and the sheet structure at least partially cover the height adjustment slot. When the frame moves from the high position downward to the low position relative to the support stand, the support stand moves upward along the height adjustment slot to make the abutting structure push the sheet structure upward, for sliding the sheet structure from the covering position laterally to the opening position relative to the height adjustment slot.

The present invention further provides a height adjustment mechanism applied to height adjustment of a display monitor. The display monitor has a frame. A height adjustment slot is formed on a back side of the frame. The height adjustment mechanism includes a base, a sheet structure, a sliding plate, and a support stand. The base is fixed in the frame corresponding to the height adjustment slot. The sheet structure is disposed in the frame in a laterally slidable manner to be slidable between a covering position and an opening position relative to the height adjustment slot. The sliding plate is slidably disposed in the base. The sliding plate has an abutting structure abutting under the sheet structure. The support stand has a support arm and a bottom plate. The support arm extends upward from the bottom plate to pass through the height adjustment slot to be connected to the sliding plate for making the frame movable between a high position and a low position relative to the support stand. When the frame is located at the high position, the abutting structure and the sheet structure at least partially cover the height adjustment slot. When the frame moves from the high position downward to the low position relative to the support stand, the support stand moves upward along the height adjustment slot to make the abutting structure push the sheet structure upward, for sliding the sheet structure from the covering position laterally to the opening position relative to the height adjustment slot.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a partial enlarged diagram of a display apparatus according to another embodiment of the present invention.

DETAILED DESCRIPTION

Figure 1:
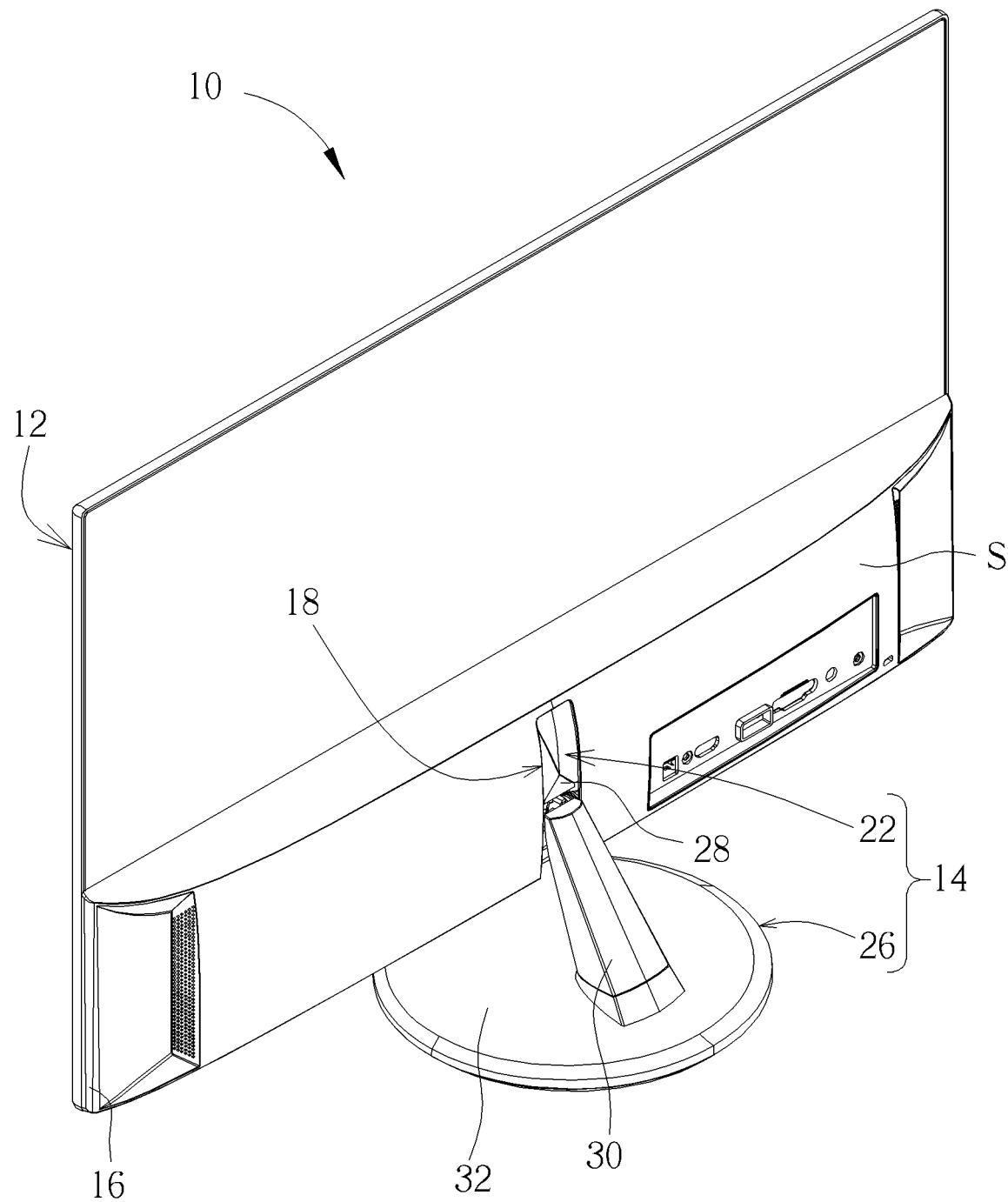
FIG. 1 is a diagram of a display apparatus according to an embodiment of the present invention.
Figure 2:
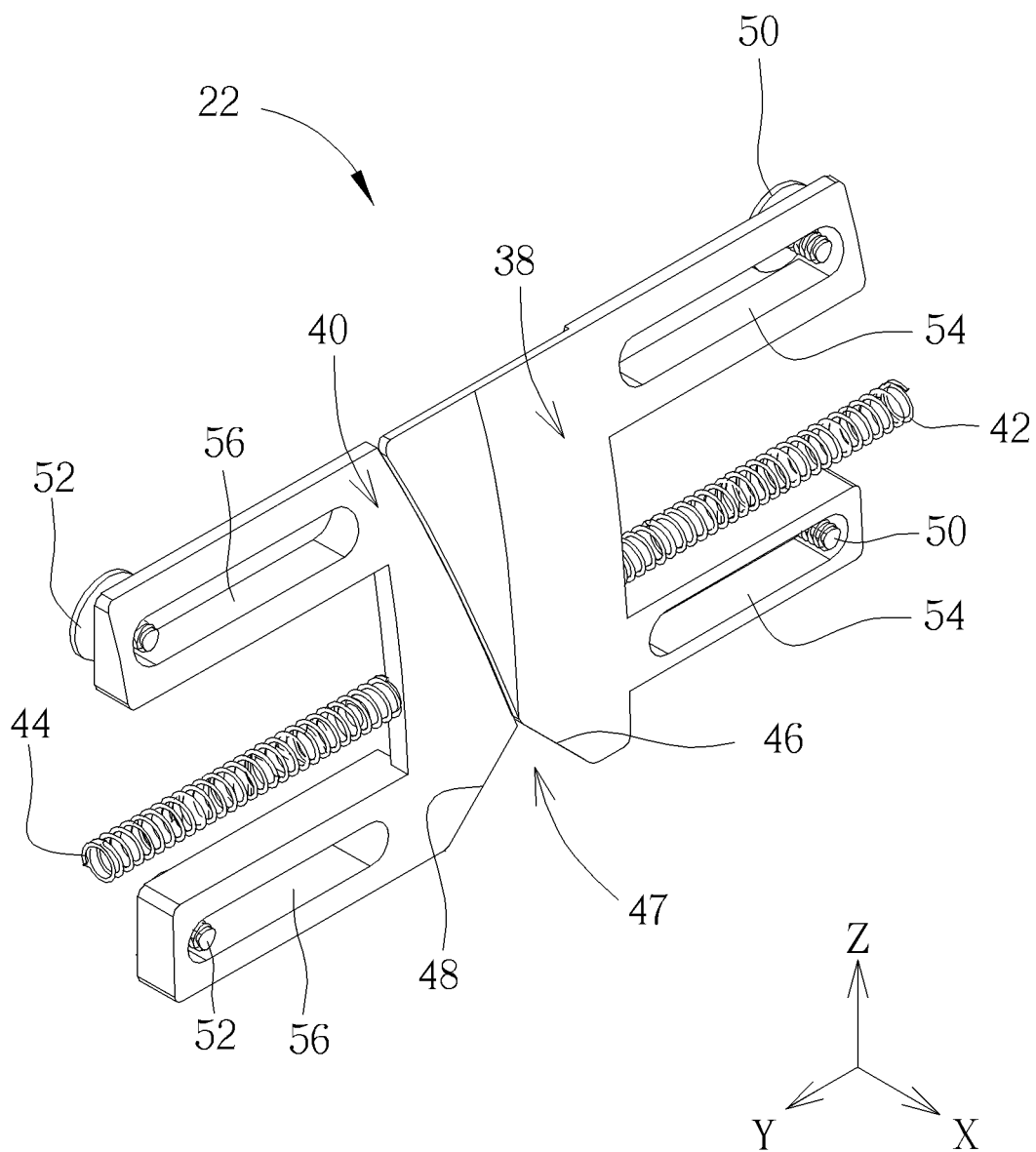
FIG. 2 is an enlarged diagram of a sheet structure in FIG. 1.
Figure 3:
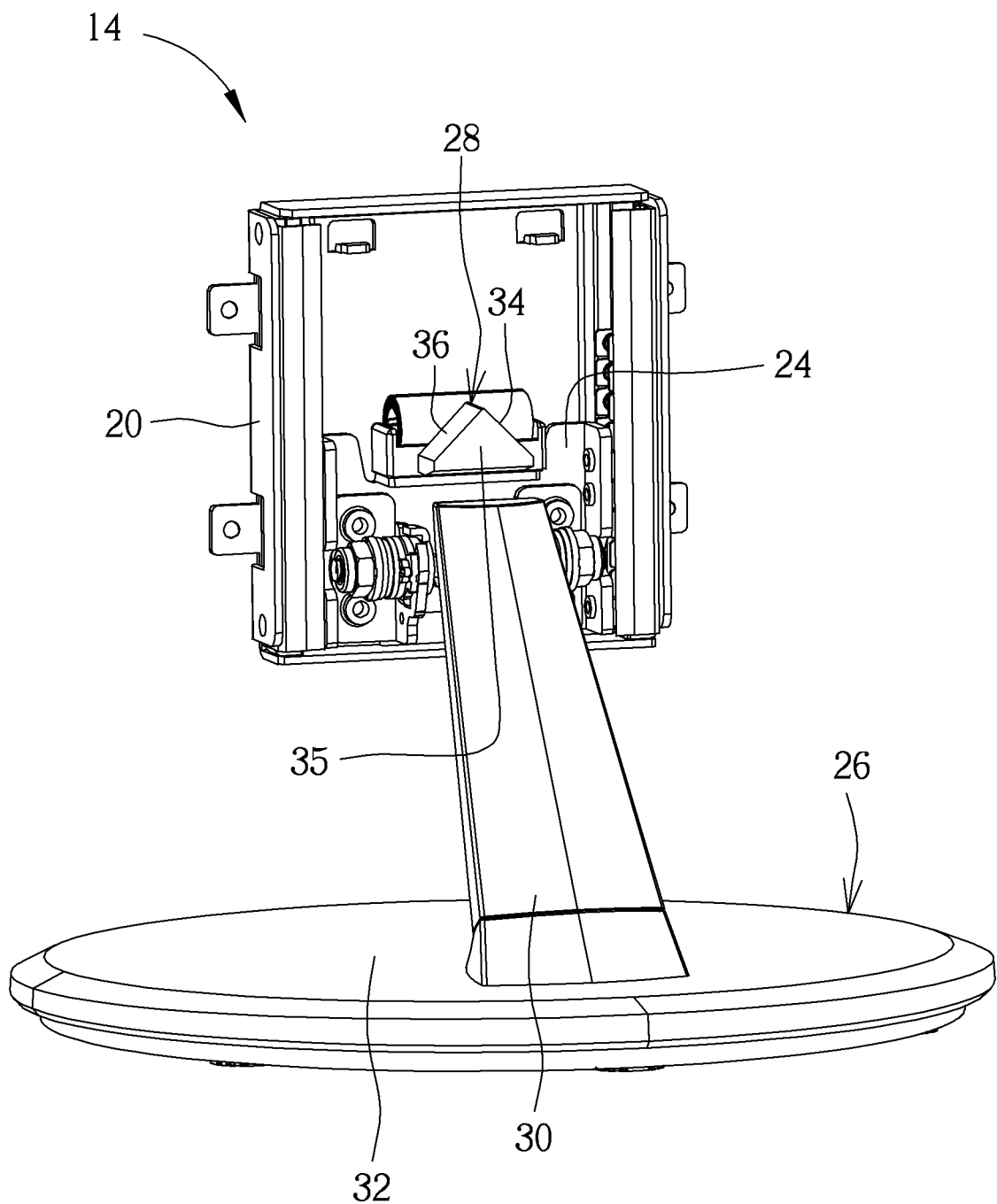
FIG. 3 is a partial diagram of a height adjustment mechanism in FIG. 1.

Please refer to FIG. 1, FIG. 2, and FIG. 3. FIG. 1 is a diagram of a display apparatus 10 according to an embodiment of the present invention. FIG. 2 is an enlarged diagram of a sheet structure 22 in FIG. 1. FIG. 3 is a partial diagram of a height adjustment mechanism 14 in FIG. 1. As shown in FIG. 1, FIG. 2, and FIG. 3, the display apparatus 10 includes a display monitor 12 and the height adjustment mechanism 14. The display monitor 12 could be a display device (e.g. a liquid crystal display monitor, but not limited thereto) commonly seen in the prior art and has a frame 16. A height adjustment slot 18 is formed on a back side S of the frame 16. The height adjustment mechanism 14 is connected to the back side S of the frame 16. The height adjustment mechanism 14 includes a base 20, the sheet structure 22, a sliding plate 24, and a support stand 26. The base 20 is fixed in the frame 16 opposite to the height adjustment slot 18. The sheet structure 22 is disposed in the base 20 in a laterally slidable manner to be slidable relative to the height adjustment slot 18. The sliding plate 24 is slidably disposed in the base 20 and has an abutting structure 28 abutting under the sheet structure 22 (as shown in FIG. 1). The support stand 26 has a support arm 30 and a bottom plate 32. The support arm 30 extends upward from the bottom plate 32 and passes through the height adjustment slot 18 to be connected to the sliding plate 24, so that the frame 16 can be movable between a high position and a low position relative to the support stand 26.

To be more specific, in this embodiment, a first inclined surface 34 and a third inclined surface 36 could be formed on the abutting structure 28, and the sheet structure 22 could include a first sheet 38, a second sheet 40, a first elastic member 42, and a second elastic member 44. As shown in FIG. 3, the third inclined surface 36 extends from the first inclined surface 34 to form a triangular protrusion 35 on the abutting structure 28, the first sheet 38 is overlapped with the second sheet 40 and arranged opposite to each other. A second inclined surface 46 is formed on the first sheet 38 corresponding to the first inclined surface 34, and a fourth inclined surface 48 is formed on the second sheet 40 corresponding to the third inclined surface 36. Accordingly, when the frame 16 is located at the high position, the second inclined surface 46 and the fourth inclined surface 48 forma triangular opening 47 cooperatively (as shown in FIG. 2) to match with the triangular protrusion 35, so as to make the abutting structure 28 cover the height adjustment slot 18 cooperatively with the first sheet 38 and the second sheet 40. The first elastic member 42 (e.g. a spring, but not limited thereto) is connected to the first sheet 38 and the frame 16. The first elastic member 42 provides elastic force to drive the first sheet 38 to return to its original position for covering the height adjustment slot 18 when the frame 16 is located at the high position. The second elastic member 44 (e.g. a spring, but not limited thereto) is connected to the second sheet 40 and the frame 16. Similarly, the second elastic member 44 provides elastic force to drive the second sheet 40 to return to its original position for covering the height adjustment slot 18 when the frame 16 is located at the high position.

As shown in FIG. 2, the sheet structure 22 could further include at least one first fixing member 50 and at least one second fixing member 52 (preferably two screws shown in FIG. 2, but not limited thereto). The first sheet 38 has a first sliding slot 54 extending laterally (in the Y-axis direction) therefrom corresponding to the first fixing member 50 and a second sliding slot 56 extending laterally (in the Y-axis direction) therefrom corresponding to the second fixing member 52. As such, the first fixing member 50 and the second fixing member 52 can pass through the first sliding slot 54 and the second sliding slot 56 respectively to be fixed to the frame 16 (e.g. by screws), so as to guide the first sheet 38 and the second sheet 40 to be slidable laterally between a covering position and an opening position relative to the frame 16.

Figure 4:
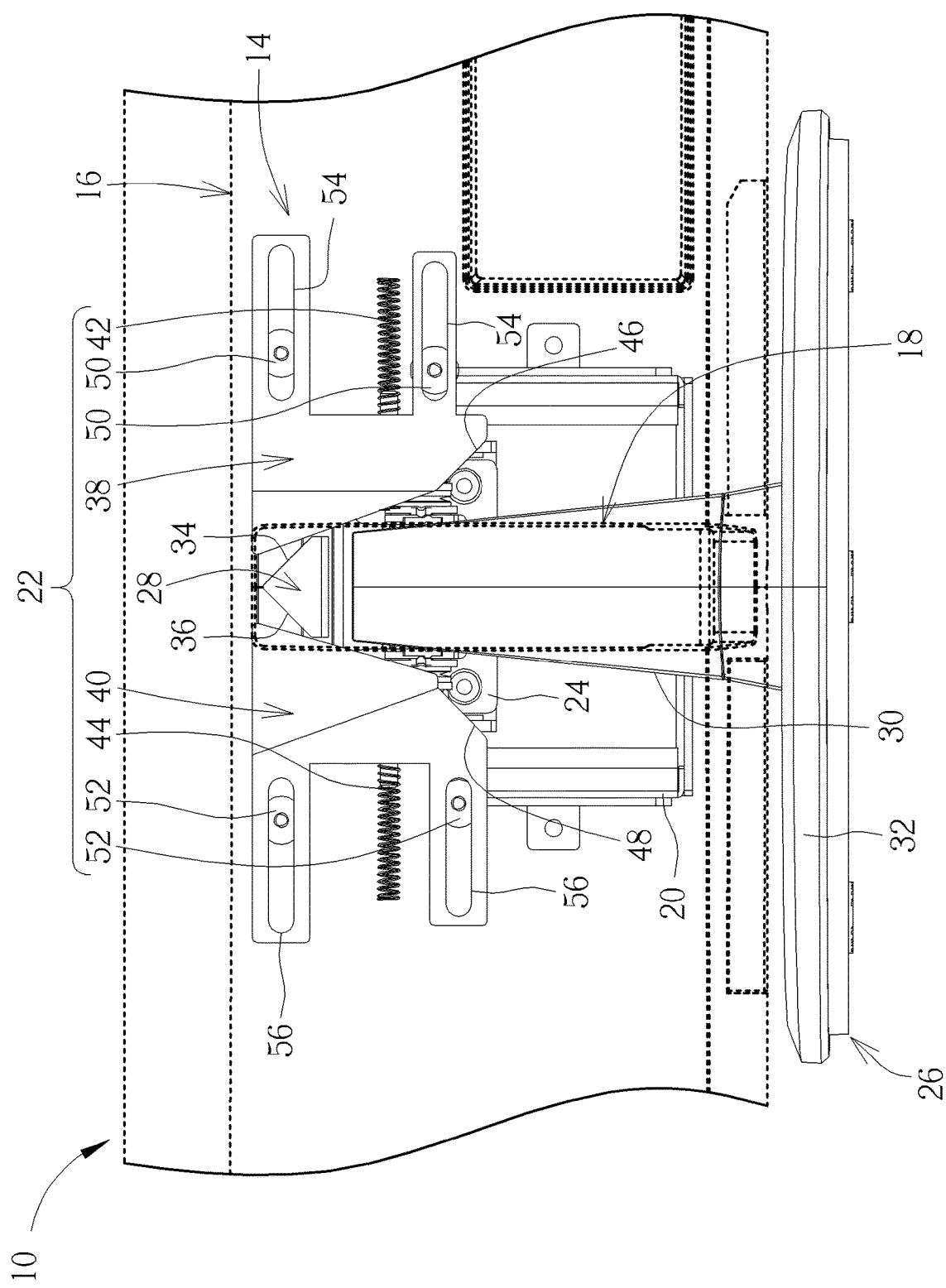
FIG. 4 is a partial enlarged diagram of the display apparatus in FIG. 1.
Figure 5:
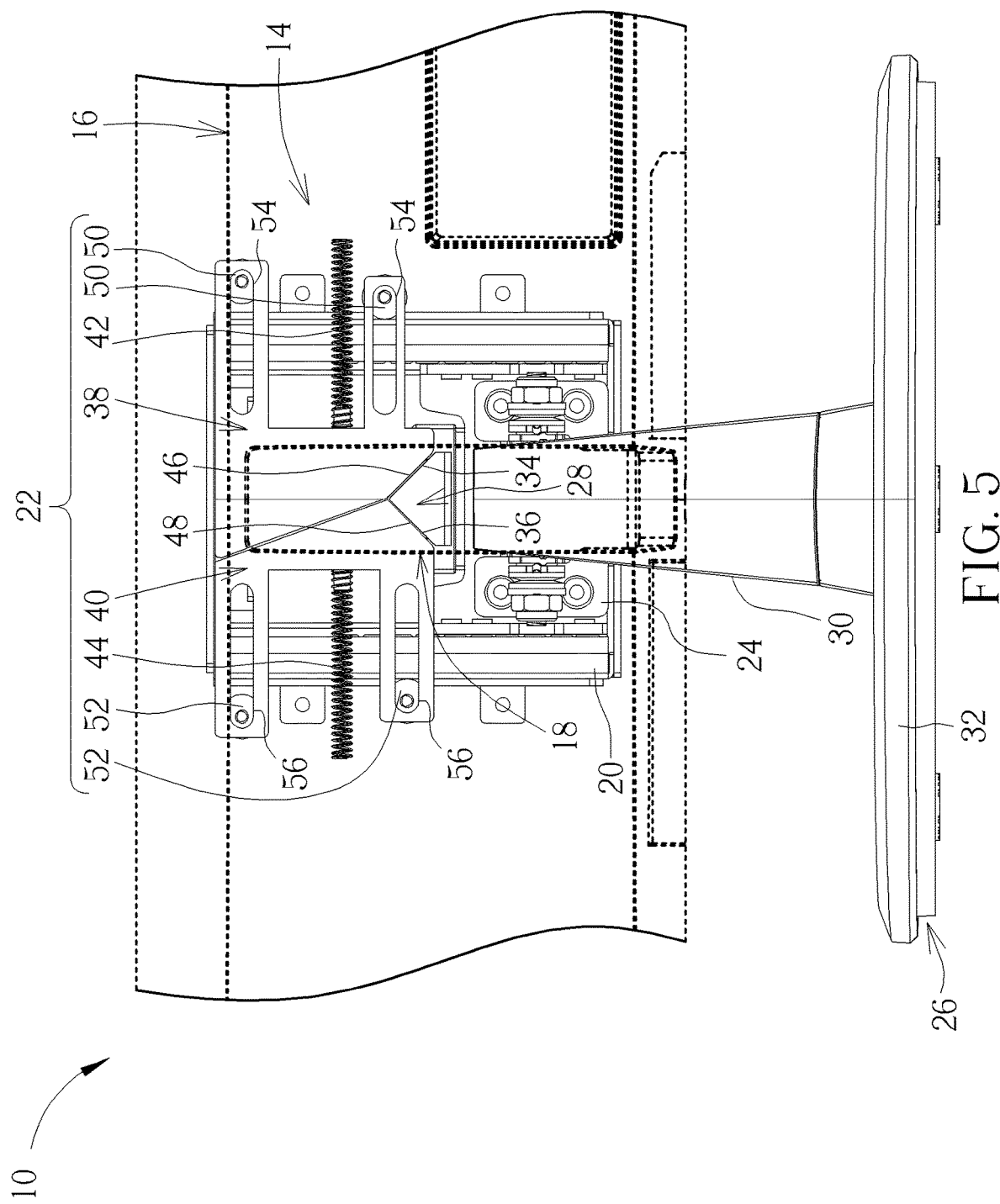
FIG. 5 is a partial enlarged diagram of the display apparatus in FIG. 4 when a frame moves to a high position.

More detailed description for the height adjustment operation of the display apparatus 10 is provided as follows. Please refer to FIG. 4 and FIG. 5. FIG. 4 is a partial enlarged diagram of the display apparatus 10 in FIG. 1. FIG. 5 is a partial enlarged diagram of the display apparatus 10 in FIG. 4 when the frame 16 moves to the high position. For clearly displaying the mechanical design of the sheet structure 22, the frame 16 is briefly depicted by dotted lines in FIGS. 4 and 5. As shown in FIG. 4, when the user wants to reduce a height of the display monitor 12 relative to the support stand 26, the user just needs to press the frame 16 to the low position as shown in FIG. 4. During this process, the base 20 and the sliding plate 24 can slide relatively with downward sliding of the frame 16. In such a manner, the support arm 30 moves upward along the height adjustment slot 18 to make the abutting structure 28 push the first sheet 38 and the second sheet 40 upwardly, so that the first sheet 38 and the second sheet 40 can move laterally to the opening position as shown in FIG. 4 via guidance of the first fixing member 50 along the first sliding slot 54 and guidance of the second fixing member 52 along the second sliding slot 56. At this time, as shown in FIG. 4, the support arm 30 and the abutting structure 28 are overlapped with the height adjustment slot 18 for covering the height adjustment slot 18.

On the other hand, when the user wants to increase the height of the display monitor 12 relative to the support stand 26, the user just needs to lift the frame 16 from the low position as shown in FIG. 4 to the high position as shown in FIG. 5. During this process, the base 20 and the sliding plate 24 can slide relatively with upward sliding of the frame 16. In such a manner, the support arm 30 moves downward along the height adjustment slot 18 to partially expose the height adjustment slot 18. At this time, since the abutting structure 18 no longer pushes the first sheet 38 and the second sheet 40, the first elastic member 42 and the second elastic member 44 can provide elastic force to drive the first sheet 38 and the second sheet 40 to move from the opening position as shown in FIG. 4 back to the covering position as shown in FIG. 5. Accordingly, the first inclined surface 34 and the third inclined surface 36 of the abutting structure 28 can match with the second inclined surface 46 of the first sheet 36 and the fourth inclined surface 48 of the second sheet 40 respectively. In such a manner, as shown in FIG. 5, the abutting structure 28 can cover the height adjustment slot 18 cooperatively with the first sheet 38, the second sheet 40 and the support arm 30 for generating the slot covering effect.

In summary, via the aforesaid design in which the sheet structure is slidable laterally in the frame and the abutting structure abuts under the sheet structure, the present invention can utilize the sheet structure to cover the height adjustment slot of the frame, so as to efficiently solve the prior art problem that the support arm cannot completely cover the height adjustment slot when the user raises the display monitor. In such a manner, the present invention can surely prevent the user from seeing the mechanisms inside the display monitor through the height adjustment slot, so as to greatly improve the external appearance and the use feeling of the display monitor.

It should be mentioned that the sheet returning design could be omitted for simplifying the structural design of the sheet structure. For example, in another embodiment that the first elastic member and the second elastic member are omitted, when the frame moves to the high position, the user can return the first sheet and the second sheet to the covering position manually or by utilizing an auxiliary tool since the abutting structure no longer pushes the first sheet and the second sheet. As such, the abutting structure can cover the height adjustment slot cooperatively with the first sheet, the second sheet and the support arm for generating the slot covering effect. Moreover, the structural abutment design for the abutting structure, the first sheet and the second sheet is not limited to the aforesaid embodiment (i.e. the inclined-surface matching design). That is, the designs in which the abutting structure abuts under the sheet structure and can push the sheet structure to slide laterally with upward movement of the frame may fall within the scope of the present invention. For example, in another embodiment, the abutting structure could be a protruding point structure to abut under the sheet structure in a point-to-surface contact manner. Accordingly, when the frame is located at the high position, the abutting structure and the sheet structure can at least partially cover the height adjustment slot. As for the detailed description for this embodiment and the derived embodiments (e.g. the embodiment in which the abutting structure could be a curved-surface structure to abut under the sheet structure in a curved-surface matching manner), it could be reasoned by analogy according to the aforesaid embodiment and omitted herein.

Furthermore, the present invention could adopt the one-sheet design. For example, please refer to FIG. 6, which is a partial enlarged diagram of a display apparatus 100 according to another embodiment of the present invention. For clearly displaying the mechanical design of a sheet structure 104, the frame 16 is briefly depicted by dotted lines in FIG. 6. Components both mentioned in this embodiment and the aforesaid embodiments represent components with similar functions or structures, and the related description is omitted herein. As shown in FIG. 6, the display apparatus 100 includes the display monitor 12 (not shown in FIG. 6) and a height adjustment mechanism 102. The height adjustment mechanism 102 includes the base 20, the support stand 26, the sheet structure 104, and a sliding plate 106. The sheet structure 104 includes a first sheet 108 and the first elastic member 42. The sliding plate 106 is slidably disposed in the base 20 and has an abutting structure 110. A first inclined surface 111 is formed on the abutting structure 110, and a second inclined surface 109 is formed on the first sheet 108 corresponding to the first inclined surface 111. As such, when the frame 16 is located at the high position as shown in FIG. 6, the first elastic member 42 provides elastic force to drive the first sheet 108 to the covering position as shown in FIG. 6, so as to make the first inclined surface 111 match with the second inclined surface 109. In such a manner, as shown in FIG. 6, the abutting structure 110 can cover the height adjustment slot 18 cooperatively with the first sheet 108 and the support arm 30 for generating the slot covering effect. As for the other related description for the display apparatus 100 (e.g. the sheet sliding design and the structural abutting design), it can be reasoned by analogy according to the aforesaid embodiments and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display apparatus comprising:
   a display monitor having a frame, a height adjustment slot being formed on a back side of the frame; and
   a height adjustment mechanism connected to the back side of the frame, the height adjustment mechanism comprising:
   a base fixed in the frame corresponding to the height adjustment slot;
   a sheet structure disposed in the frame in a laterally slidable manner to be slidable between a covering position and an opening position relative to the height adjustment slot;
   a sliding plate slidably disposed in the base, the sliding plate having an abutting structure abutting under the sheet structure; and
   a support stand having a support arm and a bottom plate, the support arm extending upward from the bottom plate to pass through the height adjustment slot to be connected to the sliding plate for making the frame movable between a high position and a low position relative to the support stand;
   wherein when the frame is located at the high position, the abutting structure and the sheet structure at least partially cover the height adjustment slot;
   when the frame moves from the high position downward to the low position relative to the support stand, the support stand moves upward along the height adjustment slot to make the abutting structure push the sheet structure upward, for sliding the sheet structure from the covering position laterally to the opening position relative to the height adjustment slot.

2. The display apparatus of claim 1, wherein a first inclined surface is formed on the abutting structure, and the sheet structure comprises:
   a first sheet having a second inclined surface corresponding to the first inclined surface, the first inclined surface contacting the second inclined surface to make the abutting structure cover the height adjustment slot cooperatively with the first sheet.

3. The display apparatus of claim 2, wherein the sheet structure further comprises:
   a first elastic member connected to the first sheet and the frame for providing elastic force to drive the first sheet back to the covering position when the frame is located at the high position.

4. The display apparatus of claim 2, wherein the sheet structure further comprises at least one first fixing member, at least one first sliding slot extends laterally from the first sheet, and the at least one first fixing member passes through the at least one first sliding slot and is fixed to the frame to guide the first sheet to slide laterally relative to the frame.

5. The display apparatus of claim 2, wherein a third inclined surface extends from the first inclined surface to form a triangular protrusion on the abutting structure, and the sheet structure further comprises:
   a second sheet overlapped with the first sheet and arranged opposite to each other, the second sheet having a fourth inclined surface corresponding to the abutting structure, the second inclined surface and the fourth inclined surface cooperatively forming an triangular opening to match with the triangular protrusion when the frame is located at the high position, to make the abutting structure cover the height adjustment slot cooperatively with the first sheet and the second sheet.

6. The display apparatus of claim 5, wherein the sheet structure further comprises:
   a second elastic member connected to the second sheet and the frame for providing elastic force to drive the second sheet back to the covering position when the frame is located at the high position.

7. The display apparatus of claim 5, wherein the sheet structure further comprises at least one second fixing member, at least one second sliding slot extends laterally from the second sheet, and the at least one second fixing member passes through the at least one second sliding slot and is fixed to the frame to guide the second sheet to slide laterally relative to the frame.

8. A height adjustment mechanism applied to height adjustment of a display monitor, the display monitor having a frame, a height adjustment slot being formed on a back side of the frame, the height adjustment mechanism comprising:

a base fixed in the frame corresponding to the height adjustment slot;

a sheet structure disposed in the frame in a laterally slidable manner to be slidable between a covering position and an opening position relative to the height adjustment slot;

a sliding plate slidably disposed in the base, the sliding plate having an abutting structure abutting under the sheet structure; and a support stand having a support arm and a bottom plate, the support arm extending upward from the bottom plate to pass through the height adjustment slot to be connected to the sliding plate for making the frame movable between a high position and a low position relative to the support stand;

wherein when the frame is located at the high position, the abutting structure and the sheet structure at least partially cover the height adjustment slot;

when the frame moves from the high position downward to the low position relative to the support stand, the support stand moves upward along the height adjustment slot to make the abutting structure push the sheet structure upward, for sliding the sheet structure from the covering position laterally to the opening position relative to the height adjustment slot.

9. The height adjustment mechanism of claim 8, wherein a first inclined surface is formed on the abutting structure, and the sheet structure comprises:

a first sheet having a second inclined surface corresponding to the first inclined surface, the first inclined surface contacting the second inclined surface to make the abutting structure cover the height adjustment slot cooperatively with the first sheet.

10. The height adjustment mechanism of claim 9, wherein the sheet structure further comprises:

a first elastic member connected to the first sheet and the frame for providing elastic force to drive the first sheet back to the covering position when the frame is located at the high position.

11. The height adjustment mechanism of claim 9, wherein the sheet structure further comprises at least one first fixing member, at least one first sliding slot extends laterally from the first sheet, and the at least one first fixing member passes through the at least one first sliding slot and is fixed to the frame to guide the first sheet to slide laterally relative to the frame.

12. The height adjustment mechanism of claim 9, wherein a third inclined surface extends from the first inclined surface to form a triangular protrusion on the abutting structure, and the sheet structure further comprises:

a second sheet overlapped with the first sheet and arranged opposite to each other, the second sheet having a fourth inclined surface corresponding to the abutting structure, the second inclined surface and the fourth inclined surface cooperatively forming an triangular opening to match with the triangular protrusion when the frame is located at the high position, to make the abutting structure cover the height adjustment slot cooperatively with the first sheet and the second sheet.

13. The height adjustment mechanism of claim 12, wherein the sheet structure further comprises:

a second elastic member connected to the second sheet and the frame for providing elastic force to drive the second sheet back to the covering position when the frame is located at the high position.

14. The height adjustment mechanism of claim 12, wherein the sheet structure further comprises at least one second fixing member, at least one second sliding slot extends laterally from the second sheet, and the at least one second fixing member passes through the at least one second sliding slot and is fixed to the frame to guide the second sheet to slide laterally relative to the frame.

* * * * *